United States Patent [19]

Keeler

[11] E Re. 31,496

[45] Reissued Jan. 17, 1984

[54] TAMPER-PROOF CLOSURE

[75] Inventor: Frederick D. Keeler, Trumball, Conn.

[73] Assignee: The KLM Corporation, Bridgeport, Conn.

[21] Appl. No.: 261,623

[22] Filed: May 7, 1981

Related U.S. Patent Documents

Reissue of:

[64] Patent No.: 4,153,174
Issued: May 8, 1979
Appl. No.: 873,978
Filed: Jan. 31, 1978

U.S. Applications:

[63] Continuation of Ser. No. 632,763, Nov. 17, 1975, abandoned, which is a continuation of Ser. No. 357,493, May 4, 1973, abandoned.

[51] Int. Cl.[3] ..... B65D 41/34
[52] U.S. Cl. ..... 215/252
[58] Field of Search ..... 215/252

[56] References Cited

U.S. PATENT DOCUMENTS

| | | | |
|---|---|---|---|
| 2,104,236 | 1/1938 | Mermer | 215/252 |
| 2,124,873 | 7/1938 | Conner | 215/252 |
| 2,134,178 | 10/1938 | Esposito | 215/252 |
| 2,162,712 | 6/1939 | Hamberger | 215/252 |
| 2,168,321 | 8/1939 | Burrell | 215/252 |
| 2,414,420 | 1/1947 | Sebell | 215/252 |
| 2,423,582 | 7/1947 | Coleman | 215/252 |
| 2,470,057 | 5/1949 | Spender | 215/252 X |
| 2,950,832 | 8/1960 | Brune | 215/252 |
| 3,235,115 | 2/1966 | Duke | 215/252 |
| 3,249,247 | 5/1966 | Babiol | 215/252 |
| 3,455,478 | 7/1969 | Fields | 215/252 |
| 3,482,725 | 12/1969 | Exton | 215/337 |
| 3,504,818 | 4/1970 | Crisci et al. | 215/252 |
| 3,606,063 | 9/1971 | Childs et al. | 215/337 X |

FOREIGN PATENT DOCUMENTS

| | | | |
|---|---|---|---|
| 2144423 | 3/1973 | Fed. Rep. of Germany | 215/330 |
| 851511 | 3/1939 | France | 215/253 |

*Primary Examiner*—Donald F. Norton
*Attorney, Agent, or Firm*—Darby & Darby

[57] ABSTRACT

A tamper-proof closure for a container having a member projecting from its neck, in which the closure is thermoformed with a skirt wall having a tab which engages the projecting member and which breaks off as the closure is unfastened from the container.

19 Claims, 13 Drawing Figures

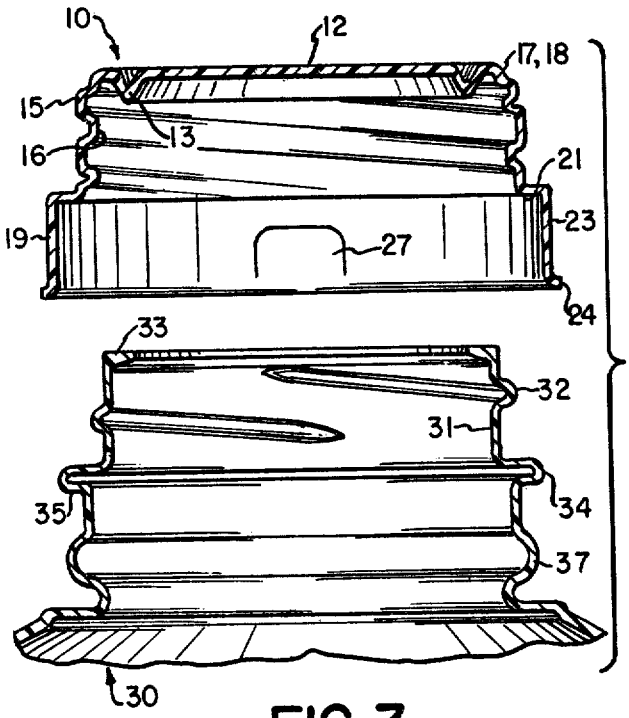
FIG. 1
FIG. 1A
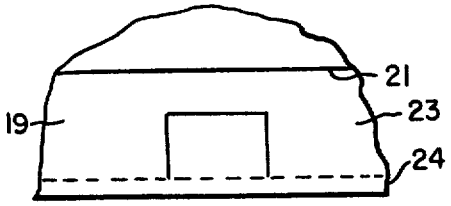
FIG. 2
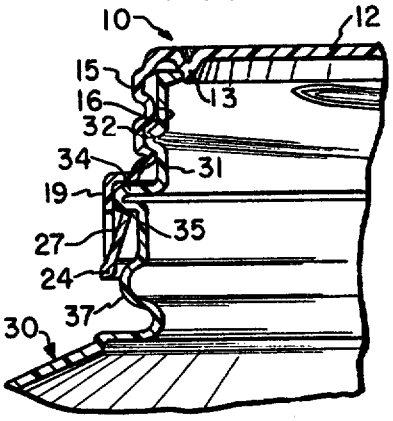
FIG. 3
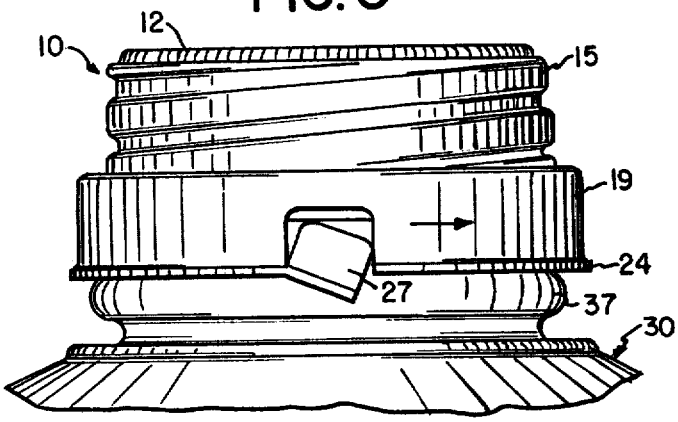
FIG. 4
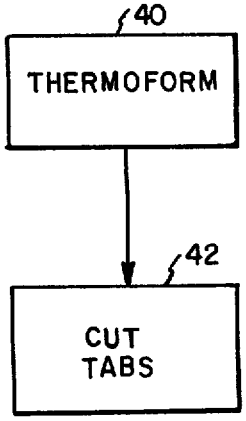
FIG. 5
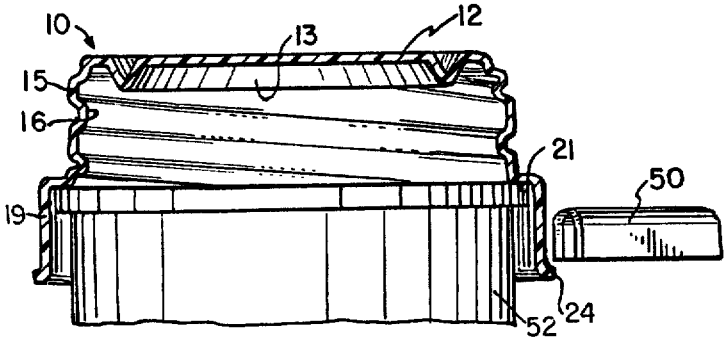

TAMPER-PROOF CLOSURE

Matter enclosed in heavy brackets [ ] appears in the original patent but forms no part of this reissue specification; matter printed in italics indicates the additions made by reissue.

This application is a continuation of my prior application Ser. No. 632,763, filed Nov. 17, 1975 now abandoned, which application in turn was a continuation of my then copending application Ser. No. 357,493 filed May 4, 1973, the latter said application now being abandoned.

This invention relates to containers and "tamper-proof" closures therefore in which one or more portions of the closure are broken away to indicate to a user or purchaser that the container has previously been fully or partly opened.

Tamper-proof closures previously have been employed on bottles and other containers to provide an indication that the closure has previously been removed from the container.

Spender, U.S. Pat. No. 2,470,057 shows a metal closure having one or more locking lugs on the skirt wall. After the closure is fastened to the container, a force is applied by a separate tool to push the lugs under the container's transfer ring. The skirt wall is also specially formed in the respective areas of the lugs to bias the lugs inwardly. When the closure is unfastened, the lugs break off.

Closures of the type shown in the Spender patent are relatively expensive to make, due to the metal forming steps required. In addition, a separate operation is required to press the lugs inwardly into operative relationship with the transfer ring. This is relatively different to do on a high speed bottling operation since the bottles on which the closures are used have to be precisely aligned to the tool used to press in the lugs.

The present invention relates to a closure of the tamper-proof type which also is constructed so as to substantially reduce the probability that the closure will pop off in case that the container is accidentally dropped. In accordance with the invention, the closure is of plastic material preferably made by a thermoforming process. One or more bendable tabs are formed as part of the skirt wall of the closure at positions to mate with a projecting member on the container. The closure material is relatively brittle so that when the closure is unfastened from the container, the tabs are held stationary so that they will be broken away as the closure is removed.

In a preferred form of the invention, the container is formed with a tamper ring in addition to and above the transfer or bumper ring normally on the container neck. The closure skirt wall is formed with an extension to cover the tamper ring. One or more tabs are formed on the skirt wall extension and extend inwardly so that when the closure is tightened onto the container the tabs ride over the tamper ring and move inwardly beneath the under surface of the tamper ring. When the closure is unfastened from the container, the tabs engage the underside of the tamper ring and are broken away as the closure is further removed.

It is therefore an object of the present invention to provide a tamper-proof container closure.

A further object is to provide a thermoformed tamper-proof container closure in which one or more tabs are provided to engage projections on the container, the tabs being broken away as the closure is unfastened.

Another object is to provide a tamper-proof container closure having an extending skirt wall which overlies a tamper ring on a container, the skirt wall having tabs to engage the tamper ring, the tabs being broken away as the closure is unfastened from the container.

Another object is to provide a method for making a thermoformed, tamper-proof plastic closure.

Other objects and advantages of the present invention will become more apparent upon reference to the following specification and annexed drawings in which FIG. 1 is an exploded perspective view showing the closure and a portion of the neck of a container;

FIG. 1A shows another form of tab for the closure;

FIG. 2 is a view showing the closure fastened to the container;

FIG. 3 is a view showing the closure as it is being unfastened from the container;

FIG. 4 is a schematic diagram of the method for producing the closure;

FIG. 5 shows the cutting operation;

Figure 6:
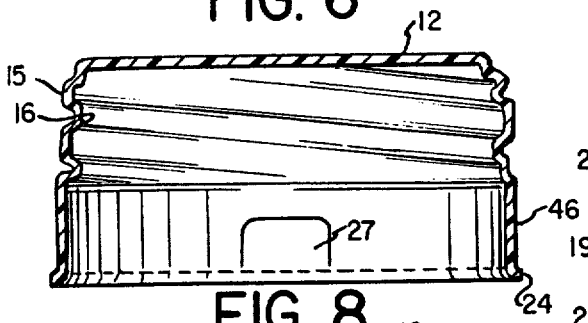
FIG. 6 shows another form of closure with break away tabs.

FIG. 1 shows a preferred form of closure 10 utilized with the present invention. The closure is preferably made by thermoforming techniques from a sheet of plastic material of substantially uniform thickness by drawing the same over a male mold or into a female mold. Closures of the foregoing type are shown, for example, in the prior patents of Norman T. Exton, U.S. Pat. No. 3,482,725 granted Dec. 9, 1969 and Edmond Childs et al., U.S. Pat. No. 3,606,063 granted Sept. 20, 1971. Both of said patents are assigned to the assignee of the subject application. As described in the two aforesaid patents, the closure formed is of relatively thin plastic material so that it has substantial flexibility or resiliency in all directions. Materials for forming the closure are any suitable plastic material such as, for example, polystyrene, polyethylene, polypropylene, ABS, etc. One suitable material is medium impact 50—50 styrene plastic having a thickness of about 0.040". The uniformity of the thickness of the closure sheet material is maintained except at those areas where the closure is deformed.

The closure 10 incorporates features of both of the aforesaid patents. It includes a top wall 12 and a downwardly depending skirt wall 15 formed with a plurality of threads 16. Threads 16 are to mate with corresponding threads on the container. While continuous threads are shown, it should be understood that the invention is equally applicable to a closure and container in which interrupted threads are used, one in which a bayonet thread fastening arrangement is used, or one in which the closure is merely placed over the neck of the bottle and sealed thereto in some other way. An indicated ring 17 if formed on the skirt wall 15 at the juncture with the top wall 12. The ring 17 is shown as being knurled at 18 to form a number of inwardly extending projections.

Top wall 12 also formed with a downwardly extending, a generally U or V shaped sealing ring 13. This is disclosed in the aforesaid Exton patent. The sealing ring 13 is used to engage the inner edge of the sealing lip of the container. This configuration of closure has advantages when used with the tamper tabs, as described below. The invention is also applicable to a closure having a flat top wall and no sealing ring. In the latter case a liner of a suitable material can be used in the area of the top wall, as is conventional and if desired.

FIG. 1 also shows a container 30 with which the closure of the subject invention is to be utilized. The container is of glass, plastic or other suitable material and is formed by any conventional technique, for example by blowing, molding, blow-molding, etc. The container includes a neck 31 having threads 32 thereon below a sealing lip 33. A tamper ring 34 is formed on the neck below the threads 32. Although not crucial to the invention, it is preferred that the underside of the transfer ring 34 be flat or slightly undercut as at 35 to provide a better lock for the break away tabs of the closure to be described.

The container is also formed with the usual bumper roll or transfer ring 37. This is located below the tamper ring 34 on the neck of the container and is used for manufacturing purposes.

As described in the two aforesaid patents, the deformed portions of the closure, such as the sealing ring 13 and the knurls 18 are somewhat thinner than the original sheet material since they have been stretched during the thermoforming process. The closure is constructed with respect to the container to which it is to be fastened so that the outer edge of the sealing ring 14 contacts the inner edge of the container's sealing lip. In addition, the diameter across the knurled section 18 of ring 17 is slightly less than the diameter of the corresponding area of the container neck. Thus, as the closure is fastened to the container 30, the sealing ring 14 makes a seal on the internal edge of its lip 33 by deforming thereover. The knurled section 18 also deforms around the top of the container neck 31 to provide a tighter and more secure fit and also to prevent doming of the closure top wall. Neither of the features of the sealing ring 14 or knurl 18 are critical to the subject invention.

Closure 10 is also formed with an extension, or shroud ring 19, at the bottom of the skirt wall 15. The shroud ring is of slightly greater diameter than the top portion of the skirt wall 15 and has an outwardly extending shoulder 21 which is joined to the skirt wall 15 and a wall 23 extending downwardly from shoulder 21. Vertical wall 23 terminates in a bead, or curved portion, 24 at its lower edge.

One or more tabs 27 are formed in the vertical wall 23 of the extension 19. The tabs are formed by cutting, piercing or lancing the wall at the appropriate places. The tabs are shown as being generally U-shaped and are inverted so as to have a hinge or pivot point adjacent the lower edge 24 of the wall 23. It should be understood, that the tabs 27 can be of any suitable shape. For example, the upper portion of the tab, instead of being curved in the manner shown in FIG. 1, can be made substantially straight as shown in the fragmentary view of FIG. 1A. The cuts forming the tab preferably extend relatively close to the lower edge 24 of the extension 19 so that the tab will break away more easily. In addition, making the cut closer to the lower edge 24 more or less insures that the tab will extend inwardly, toward the interior of the closure, rather than outwardly. This is particularly true where the lower ends of the vertical cuts forming the tab terminate in the inner radius of the curved edge 24 of the extension 19.

The cuts in the wall 23 forming the tabs 27 preferably are made from the outside toward the interior of the closure. That is, the cutting, piercing or lancing tool (not shown) enters wall 23 from outside the closure and pushes the tab inwardly into the closure interior. Thus, the tabs will be as shown in FIGS. 1 and 2 extending inwardly from the wall 23. While a single tab is shown on the closure of FIG. 1, the invention is equally applicable to two or more tabs.

Closure 10 is fastened onto container 30 in the usual manner by conventional capping equipment. As the closure is tightened down onto the container, the tab 27, being flexible, will ride over the tamper ring 34. The height of the closure and the position of the free (upper) end of the tab with respect to the tamper ring is such that the upper end of the tab will come to rest beneath the undersurface of the tamper ring. There will be a form of snap action, that is, after the tab rides over the tamper ring, it will snap inwardly toward the container neck. It is preferred that the free upper end of the tab come to rest below, rather than on, the tamper ring. This reduces the possibility of the tab riding back over the tamper ring as the closure is unfastened. As indicated previously, it is also preferred that the underside of the transfer ring be undercut, or at least substantially flat as shown in FIG. 1. This also prevents the tab from riding back over the transfer ring.

The position of the tab with the closure fastened fully onto the container is shown in FIG. 2. The lower edge 24 of the closure skirt wall comes to rest adjacent the maximum outer diameter portion of the transfer ring 37 with a slight space therebetween. This aids in permitting a person to more readily grasp the closure at the bottom of the skirt wall extension 19. The extension 19 in extending down over the bumper ring 37 covers a larger portion of the container neck and thereby improves the sanitary condition of the container.

The tab 27 also cooperates with the sealing ring 13 on the closure since it effectively vertically positions the closure on the container so that a particular point or area of the sealing ring will engage the inner edge of the container sealing lip 33. That is, the position of the upper edge of the tab 27 can be selected to engage the lower surface of the tamper ring and, at the same time, the relationship with the closure sealing ring 13 can be such that a particular area of the sealing ring, for example near its center, will engage the container sealing lip 33. By doing this, a point of more optimum sealing efficiency can be selected on the ring 13. Where only the screw thread action of the closure is relied upon, the closure can be tightened down too far, or will back off, so that the contact between ring 13 and lip 33 will be near the top or the bottom of the ring. This sealing area on ring 13 is not as effective as is the center since it allows for more material to bend over the lip.

When it is desired to unfasten the closure from the container, it is unscrewed in the normal manner. After a relatively limited upward movement of the closure, the free end of the tab engages the underside of the tamper ring. As the closure is further moved upwardly, the tab bends further inwardly. Upon continued upward movement of the closure, due to the fact that the tab cannot snap outwardly and there being a substantial engagement with the undersurface of the transfer ring, the tab will break off, as shown in FIG. 3. Once the break off occurs, there will be an open portion on the extension ring 19 where the tab was previously located. This provides a prominent visual indication that the closure has already been unfastened from the container.

As many tabs 27 can be provided on the extension 19 as desired. The size of the tabs and/or their number, determines the amount of torque necessary to unfasten the closure from the container. For example, if more tabs are utilized it takes more force to break off all of the tabs so that the closure can be removed. In this manner, the torque required to remove the closure can be controlled.

The tabs can be spaced around the skirt wall at any desired angular spacing. The use of several tabs, spaced substantially equi-angularly provides a highly visible indication of the tabs having been broken away and also more equally distributes the force produced by the tabs resisting the unfastening. This prevents, for example, the closure from cocking as it is being unfastened. However, a single tab can be used quite effectively.

Tabs 27 provide an additional advantage in that once they are locked it reduces the possibility that the closure will pop off the container if it is dropped accidentally. As a further advantage, the shroud ring 19 extends further down over the bottle closure to provide a more sanitary sealing.

FIG. 4 shows in schematic form the process for forming closures according to the subject invention. Block 40 indicates the thermoforming step of the process in which, as previously described, the closures are formed from sheet material by any conventional thermoforming process using male or female molds. After the closures come out of the thermoforming machinery, a cutting step 42 takes place in which a knife or other piercing tool 50, shown in FIG. 5, is forced through the wall of the closure to form the tab. The blade of the knife is shaped to produce the desired shape for the tab.

While the tabs can be formed with the closure still in the mold, the machinery for accomplishing this is relatively complex and expensive. Consequently, from point of view of economy of capital investment, it is preferred that the closures first be stripped from the mold and the cutting operation take place separately. This can be accomplished in any suitable way. For example, closures can be mounted on spindles or mandrels which advance past the knife, or knives, which are moved by any suitable means to cut through the closure wall at the desired location. FIG. 5 shows a stepped mandrel 52 whose upper face engages the shoulder 21 on the closure skirt wall, where several tabs are to be formed on the closure. It is preferred that a corresponding number of knives be used and operated at the same time to speed up the cutting operation. Instead of mounting the closures on mandrels, they can be placed on a conveyor belt moving between two rails forming a relatively tight fit for the closure. The knives are moved through openings in the rails. A punching operation also can be utilized.

In any case, the tab forming operation is a simple one since there is no problem with respect to the angular orientation of the closures as the tabs are formed. Also, the cut made to form the tab does not remove any material. Since it is made from the outside, the tabs will stay inside of the skirt wall and will not spring outwardly.

The closures of the invention are fastened to the containers in the conventional manner by any standard capping equipment. Since the tabs, as applied to the containers, already extend inwardly no further step is needed to bring about the positioning with respect to the transfer ring. Therefore, the capping costs are not increased and the capping speed is not changed.

FIG. 6 shows another embodiment of the invention in which the closure differs from that shown in FIG. 1 in that it has a flap top wall. Here, however, the extension of the skirt wall below the threads where the tabs 27 are located is not of greater diameter than the extension 19 of the skirt wall of FIG. 1. Instead, the skirt wall is of substantially uniform diameter throughout its height and the tabs are formed in the bottom portion 46 which extends below the threads 16.

The closure of FIG. 6 operates in substantially the same manner as that previously described with respect to the closure of FIGS. 1 through 3. It should be understood that the closure of FIG. 6 cannot accommodate as thick a tamper ring as can the closure of FIG. 1. However, the bottom of the skirt wall of the closure will spread out somewhat due to the flexibility and resiliency of the material so that it can be forced over the tamper ring. When this is done, there is a solid contact area between the free end of each of the tabs and the undersurface of the tamper ring.

Figure 7:
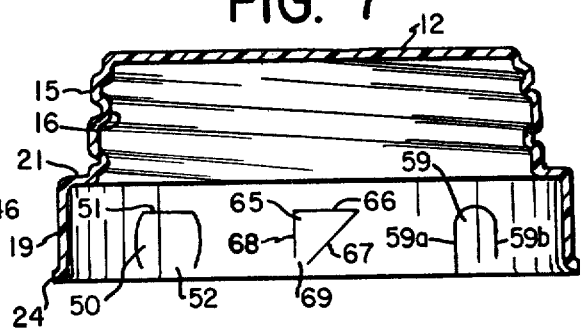
FIG. 7 is a view showing different forms of tabs.

FIG. 7 shows a closure having various forms of tabs thereon. Tab 50 is generally circular in shape with a flat top portion 51 to engage the projection on the container. The cut forming the tab is extended around at the bottom to form only a small area 52 which holds the tab to the closure. This permits the tab to break away easier.

The tab 65 has a flat free end 66 for engaging the projection on the container and two side cuts 67 and 68, with the former being at an angle to the latter leaving only a relatively small connecting piece 69.

Tab 59 is generally U-shaped as in FIG. 1. Here, however, only one leg 59a of the U is brought down near the bottom of the skirt wall. The other leg 59b terminates at a distance from the skirt wall bottom. Therefore, when the closure is unscrewed, only the bridging piece of leg 59a will break and the tab is left hanging. This type of an indication is sometimes desirable.

Figure 8:
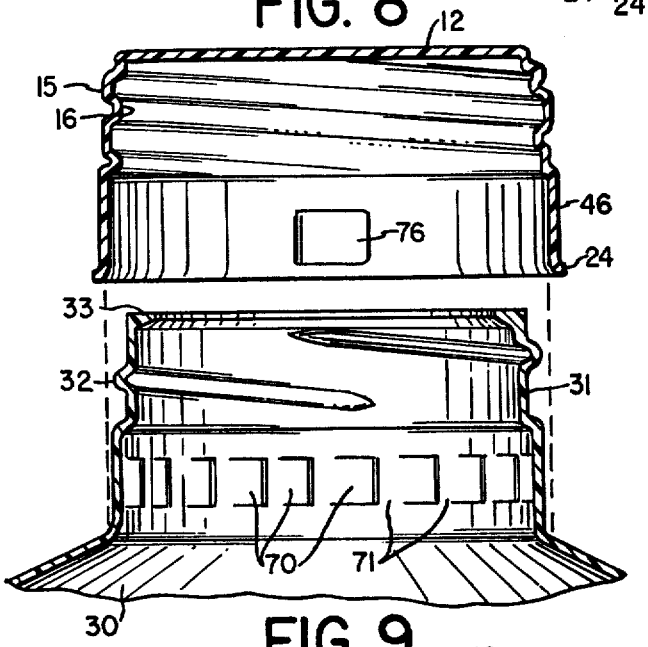
FIG. 8 is an exploded view, with the closure in cross-section, of another embodiment
Figure 8A:
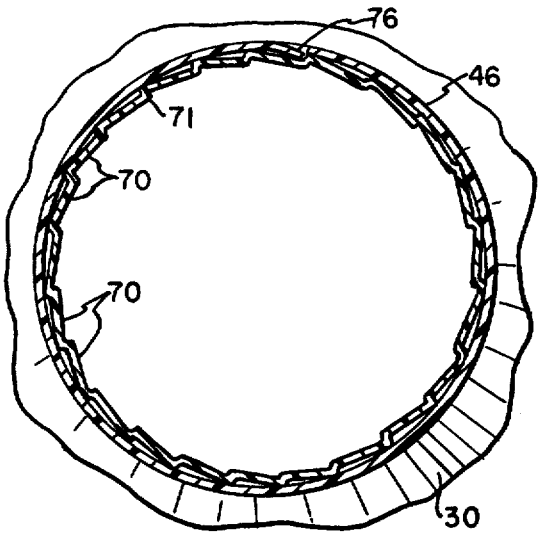
FIG. 8A is a section showing the closure on the container.

FIG. 8 shows a still further embodiment of the invention in which the tamper ring on the container is made in segments 70 around the neck of the bottle, leaving spaces 71 therebetween. The closure 10 has tabs 76 formed thereon with the free end of the tab extending in a direction generally transverse to the top wall of the closure. When the closure is fastened to the container, the free ends of the tabs 76 fall into the spaces 71 between the transfer ring segments 70. This is shown in FIG. 8A. When the closure is unthreaded from the bottle, the free ends of the tab 76 will lock against the side wall of the adjacent segment and will tear off in the manner previously described.

Figure 9:
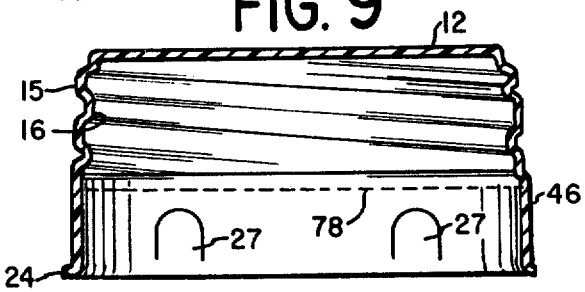
FIGS. 9, 9A and 10 are views in cross-section of other embodiments of closure.

FIG. 9 shows another embodiment of the invention wherein tabs 27 are formed on the lower portion of the skirt wall in a manner similar to that shown in FIGS. 1 and 6. In addition, a score line 78 is made around the closure between the thread and the tabs. The score line 78 is made to weaken the portion of the skirt wall 15 by an amount such that less force is needed to break away the closure along the score line 76 than is needed to break away the tabs 27. When the closure is threaded on the container, the tabs 27 engage the transfer ring in the manner previously described. As the closure is unthreaded,the free ends of the tabs engage the undersurface of the transfer ring and act to hold the closure to the container. Now, however, because of the score line 78 providing the weakened area, the closure will break away along line 78. The ring formed by the broken away portion of the skirt wall below line 78 will fall down onto the neck. This also provides a highly visible indication that the closure has previously been unfastened from the container.

Figure 9A:
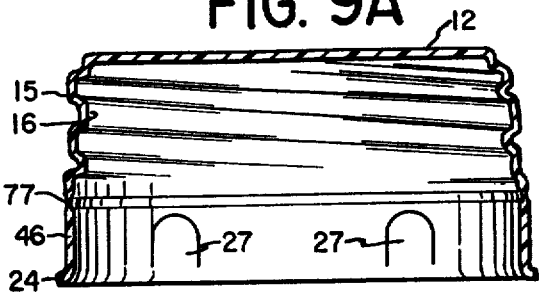

The score line 78 can be formed by any suitable arrangement such as by piercing, cutting, etc. As an alternative to this, the area where the score line 78 appears can be stretched, or thinned down, during forming of the closure to provide a weakened area. This is shown in FIG. 9A where the numeral 77 indicates the thinned down area.

Figure 10:
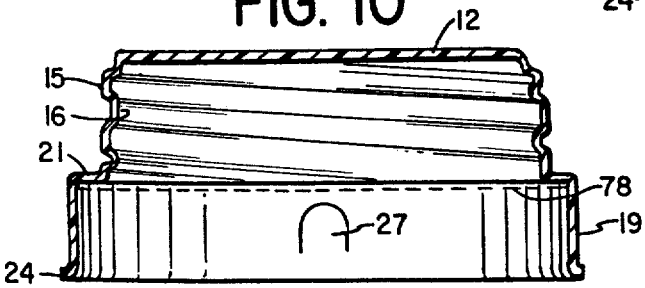

FIG. 10 shows a further embodiment similar to that of FIG. 9. Here the closure is formed as in FIG. 1 with an extension 19 of larger diameter than the remainder of the skirt wall. A score line 79 is made at the junction of the shoulder 21 and the skirt wall 15. In this embodiment, as the closure is unthreaded, the entire extension 19 is broken away and falls down on the neck.

The score lines 78, 79 of FIGS. 9 and 10 are formed as another step of the process in making the closure. This can be done at the same time the tabs are formed or at a prior or subsequent operation. If the weakened section is to be formed by thinning down the wall thickness, this can be accomplished during the thermoforming operation.

As should be apparent, the tamper proof closures of the subject invention are simple and inexpensive to produce. No additional molding steps or special closure configurations are required. All that is needed is to make the tabs on the closure wall at the appropriate places to engage the tamper ring, or other projection, on the container. This is due to the fact that the closure is thermoformed and is flexible. Therefore, the walls can be cut easily without destroying the integrity of the closure.

In a suitable case, the tamper ring of the container and/or the location of the ring and tab can be modified so that it is not necessary to use a separate tamper ring. However, the separate tamper ring has been found to work quite well.

It is also contemplated that instead of using a projection on the container which the tabs are to engage, that a cut can be made in the container wall, for example, in the form of a ring. The free end of the tabs would fall into the cut as the closure was being unthreaded to engage the top wall of the cut which would thereafter act in the same manner as the transfer ring.

What is claimed is:

1. A tamper proof closure for a container, said closure comprising a thermoformed single integral piece of sheet thermoplastic material formed with a top wall and a flexible skirt wall depending therefrom, means formed on said skirt wall adapted for fastening to mating means on a container, said closure being thermoformed remote from the container and being of substantially uniform thickness throughout except in the areas where deformed, the thermoplastic material of the closure skirt wall being cut and bent inwardly to form a tab in the closure skirt wall from the material of the skirt wall, said tab being attached to the skirt wall along a hinge line which is formed by moving the tab inwardly of the skirt wall and setting it in a fixed position by stressing the thermoplastic material along the hinge line, said tab having a free end which extends inwardly of the skirt wall adapted for engaging a portion of the container so that said tab will be broken from the skirt wall along said hinge line as the closure is unfastened from the container.

2. A tamper proof closure as in claim 1 in combination with a container having a neck with a piece thereon, the free end of said tab engaging said piece when the closure is removed from the container to produce a force tending to hold the closure to the container.

3. The combination of claim 2 wherein said piece on said container comprises a ring formed around the neck of the container.

4. The combination of claim 3 wherein the free end of the tab on the closure engages the ring as the closure is removed.

5. The combination of claim 4 wherein said tab is formed to break away from the closure skirt wall as the closure is further removed from the container.

6. The closure of claim [4 further comprising a weakened section other than the tab formed on said skirt wall] *19 wherein said container is of the type having a transfer ring below its fastening means*, said skirt wall breaking away at said weakened [section] *area* as the tab engages the transfer ring with the tab remaining on the wall when the closure is unfastened from the container.

7. The closure of claim 2 wherein said piece on said container comprises at least one segment on the neck of the container, the free end of said tab extending inwardly and engaging a wall of said segment of said piece other than the lower wall thereof, said tab being broken away as the closure is turned on the container.

8. The closure of claim 2 further comprising a downwardly extending sealing ring formed on the top wall of the closure, said tab when engaging the piece on the container positioning the closure vertically to align a selected area of the sealing ring with the sealing lip of the container neck.

9. A closure as in claim 1 wherein a portion of said skirt wall is weakened to break away.

10. A closure as in claim 9 wherein said weakened portion comprises said tab.

11. A closure as in claim [9] *19* wherein said weakened [portion] *area* of the skirt wall comprises a [larger] *below the fastening means of said skirt wall* portion which includes said tabs.

12. A closure as in claim 1 further comprising fastening means on said skirt wall, said tab located below said fastening means.

13. A closure as in claim 12 wherein said skirt wall has an enlarged diameter portion at its lower end, said tab being formed on said enlarged diameter portion.

14. A closure as in claim [13] *19* wherein said *skirt wall has an enlarged diameter portion at its lower end, said weakened selected area of said closure skirt wall being within said* enlarged diameter portion of said closure skirt wall [is weakened to break away] *and said enlarged diameter portion adapted* as the closure is held to the container by said tab when the closure is being removed from the container.

15. A closure as in claim 1 wherein said tab is generally of inverted U-shape with the free end of the tab extending upwardly toward the top wall of the closure.

16. A closure as in claim 1 wherein said tab is generally circular in shape, the free end of the tab extending upwardly toward the top wall of the closure.

17. A closure as in claim 1 wherein said tab has a free end portion which is wider than the portion joining the tab to the skirt wall.

18. A closure as in claim 1 wherein the tab has a free end portion and two sides, one of the sides being longer than the other.

*19. A tamper proof closure for a container, said closure comprising a thermoformed single integral piece of sheet thermoplastic material formed with a top wall and a flexible skirt wall depending therefrom, means formed on said skirt wall adapted for fastening to mating means on a container, said closure being thermoformed remote from the container and being of substantially uniform thickness throughout except in the areas where deformed, the thermoplastic material of the closure skirt wall being cut and bent inwardly to form a tab in the closure skirt wall from the material of the skirt wall, said tab being attached to the skirt wall along a hinge line which is formed by moving the tab inwardly of the skirt wall and setting it in a fixed position by stressing the thermoplastic material along the hinge line, the closure skirt wall being weakened at a selected area, said tab having a free end which extends inwardly of the skirt wall adapted for engaging a portion of the container so that the portion of the closure skirt wall below said weakened area will be broken from the skirt wall as the closure is unfastened from the container.*

* * * * *